United States Patent
Kwon (10) Patent No.: US 10,676,122 B2
(45) Date of Patent: Jun. 9, 2020

(54) TILT FIXING DEVICE FOR VEHICULAR STEERING COLUMN

(71) Applicant: MANDO CORPORATION, Pyeongtaek-si, Gyeonggi-do (KR)

(72) Inventor: HyunBi Kwon, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 181 days.

(21) Appl. No.: 15/876,668

(22) Filed: Jan. 22, 2018

(65) Prior Publication Data

US 2018/0208229 A1 Jul. 26, 2018

(30) Foreign Application Priority Data

Jan. 26, 2017 (KR) .......................... 10-2017-0012717
Aug. 16, 2017 (KR) .......................... 10-2017-0103842

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........ B62D 1/184; B62D 1/197; B62D 1/189; B62D 1/187
See application file for complete search history.

(56) References Cited

U.S. PATENT DOCUMENTS

| 5,338,064 | A | * | 8/1994 | Sadakata | ................ | B62D 1/184 280/775 |
| 6,092,955 | A | * | 7/2000 | Chartrain | ............... | B62D 1/184 403/104 |
| 6,092,957 | A | * | 7/2000 | Fevre | ..................... | B62D 1/184 280/775 |
| 2004/0261565 | A1 | * | 12/2004 | Uphaus | .................. | B62D 1/184 74/493 |

(Continued)

FOREIGN PATENT DOCUMENTS

| CN | 101883704 A | 11/2010 |
| CN | 102523738 A | 6/2012 |

(Continued)

OTHER PUBLICATIONS

Machine Language Translation of KR-2016-0081336 obtained from https://worldwide.espacenet.com/ on Sep. 15, 2019.*

(Continued)

*Primary Examiner* — Ruth Ilan
(74) *Attorney, Agent, or Firm* — Morgan, Lewis & Bockius LLP (57) ABSTRACT

The present embodiments provide a tilt fixing device for a vehicular steering column wherein no tooth-on-tooth phenomenon occurs between a stationary gear and a movable gear when the driver conducts a tilt locking operation; even if such a tooth-on-tooth phenomenon occurs, a first elastic member installed between the movable gear and a load support member enables tilt locking of the steering column; and, if an external impact is applied, the movable gear slides and meshes with the stationary gear by means of elastic force from the first elastic member such that there occurs a stable tilting operation of the steering column.

7 Claims, 10 Drawing Sheets

(56) References Cited

U.S. PATENT DOCUMENTS

| | | | |
|---|---|---|---|
| 2005/0016315 A1* | 1/2005 | Breuss | B62D 1/184 |
| | | | 74/493 |
| 2010/0275721 A1 | 11/2010 | Davies | |
| 2014/0000405 A1 | 1/2014 | Anspaugh et al. | |
| 2015/0203145 A1* | 7/2015 | Sugiura | B62D 1/189 |
| | | | 74/493 |
| 2016/0144885 A1* | 5/2016 | Tanaka | B62D 1/187 |
| | | | 74/493 |

FOREIGN PATENT DOCUMENTS

| | | |
|---|---|---|
| CN | 103921832 A | 7/2014 |
| CN | 106335535 A | 6/2017 |
| DE | 10212263 A1 | 10/2003 |
| KR | 10-2016-0027507 A | 3/2016 |
| KR | 20160063135 A1 | 6/2016 |
| KR | 10-2016-0081336 A | 7/2016 |

OTHER PUBLICATIONS

Office Action issued in Chinese Patent Application No. 201810071172.6 dated Feb. 3, 2020.

\* cited by examiner

TILT FIXING DEVICE FOR VEHICULAR STEERING COLUMN

CROSS REFERENCE TO RELATED APPLICATION

This application claims priority from Korean Patent Application No. 10-2017-0012717, filed on Jan. 26, 2017, and Korean Patent Application No. 10-2017-0103842, filed on Aug. 16, 2017, which are hereby incorporated by reference for all purposes as if fully set forth herein.

BACKGROUND OF THE INVENTION

1. Field of the Invention

The present embodiments relate to a vehicular steering column and, more particularly, to a tilt fixing device for a vehicular steering column.

2. Description of the Prior Art

Recent automobiles are provided with steering columns having additional telescopic or tilting functions for driver convenience. Telescopic devices enable the steering columns to extend and contract in the axial direction, and tilting devices are configured to adjust the angle of the steering columns.

The tilting operation of such a steering column is applied by fastening and unfastening an adjustment lever. When the adjustment lever is fastened, a movable gear coupled to an end of a lever bolt meshes with a stationary gear such that no tilting operation occurs. When the adjustment lever is unfastened, the stationary gear and the movable gear disengage from each other and enable the tilting operation.

However, conventional automobile steering columns have a problem in that, during the tilting operation, threads of the stationary gear and threads of the movable gear may engage with each other (tooth-on-tooth phenomenon), failing to provide the desired locking. This degrades the driver's feeling of lever manipulation and, even worse, may fracture the lever or the gears, inconveniencing the driver.

Furthermore, if unstable fixing of the steering column due to the tooth-on-tooth phenomenon of gears is followed by a collision of the automobile, the steering column pops up in the tilting direction, making it impossible to secure the driver's safety.

SUMMARY OF THE INVENTION

Present embodiments provide a tilt fixing device for a vehicular steering column configured such that, during a tilt locking operation by the driver, the steering column can be stably locked without causing the tooth-on-tooth phenomenon between the stationary gear and the movable gear.

Aspects of the present embodiments are not limited to the above description, and other aspects and advantageous effects of the present embodiments, which are not mentioned herein, could be understood from the following description.

A tilt fixing device for a vehicular steering column according to the present embodiments includes: a tilt bracket having a tilt guide coupled to an outer side of a distance bracket, a tilt hole being formed in the tilt guide, and a stationary gear including threads and troughs being formed on one of both sides of the tilt hole facing each other; a movable gear configured to mesh with or separate from the stationary gear, during a tilting operation of an adjustment lever, and to be inserted into or released from the tilt hole; a lever bolt configured to be coupled to the adjustment lever and to rotate while interworking with the adjustment lever and installed to penetrate the tilt hole and the movable gear; a load support member configured such that the lever bolt penetrates and is coupled to the load support member, one end of the load support member being supported on the tilt guide, and a different end thereof being coupled to the lever bolt by a lever nut; and a first elastic member positioned between the movable gear and the load support member so as to elastically support the movable gear in such a direction that the movable gear is inserted into the tilt hole.

The present embodiments have the following advantageous effects: even if the tooth-on-tooth phenomenon occurs between the stationary gear and the movable gear, the first elastic member installed between the movable gear and the load support member ensures tilt locking of the steering column. In addition, if an external impact is applied, the movable gear and the stationary gear mesh with each other by means of elastic force from the first elastic member such that stable tilting operation of the steering column is ensured, and the driver's safety is guaranteed.

The advantageous effects of the present embodiments are not limited to those described above, and are to be understood as encompassing all advantageous effects that could be inferred from the configuration of the embodiments described in the detailed description or the claims.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings. However, these embodiments may be implemented in various different forms and the present disclosure is not limited to the embodiments described herein. Further, parts irrelevant to the present disclosure are omitted in the drawings to make the present disclosure clear and the same reference numerals are designated to the same or similar components throughout the specification.

In embodiments of the present disclosure, when it is described that an element is "connected" to another element, not only the first element may be "connected directly" to the second element, but the first element may also be "electrically connected" to the second element while a third element is interposed therebetween. In the entire specification of the present application, when it is described that a certain unit "includes" a certain element, this means that the unit may include any other element rather than exclude the any other element unless otherwise described.

Hereinafter, present embodiments will be described in detail with reference to the accompanying drawings.

Figure 1:
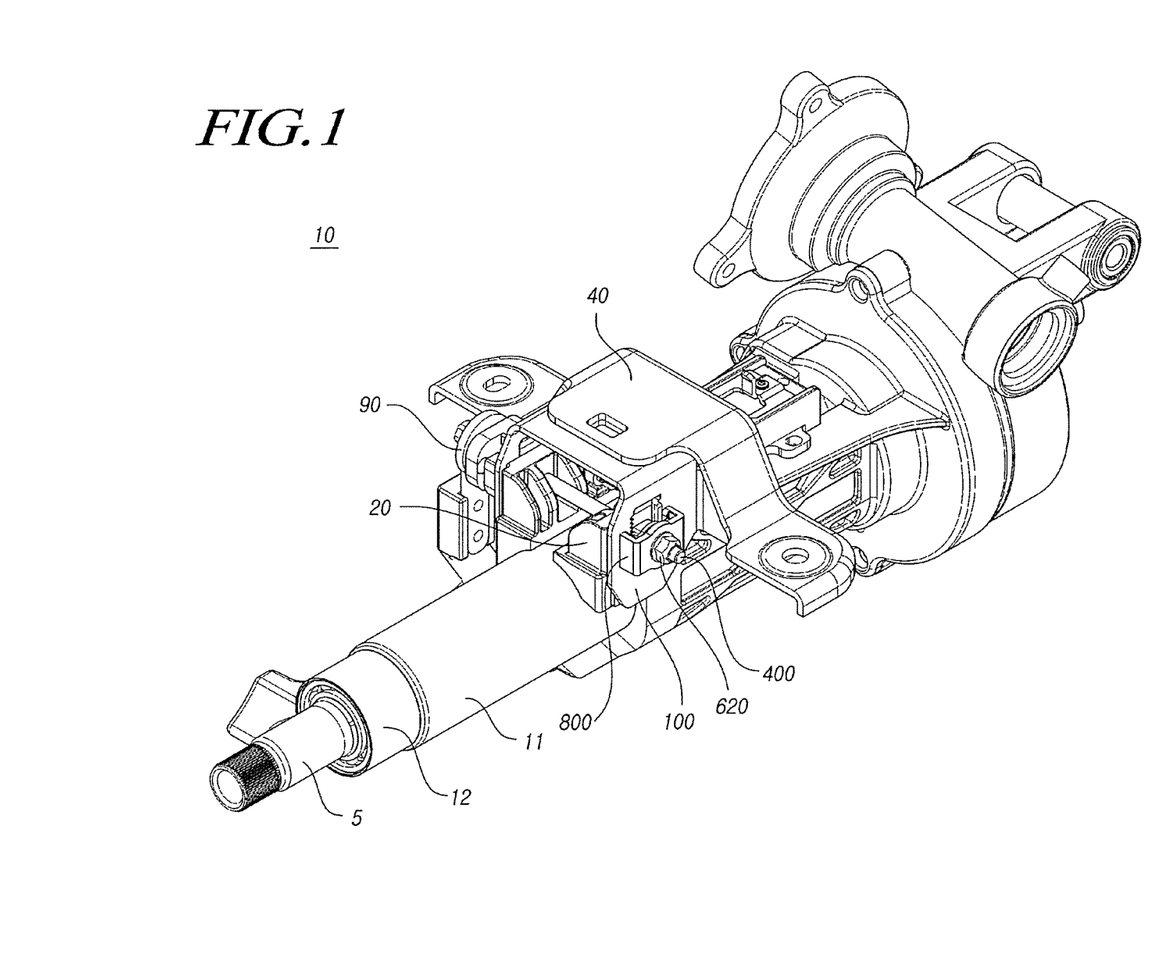
FIG. 1 is a perspective view illustrating a steering column according to the present embodiments.
Figure 2:
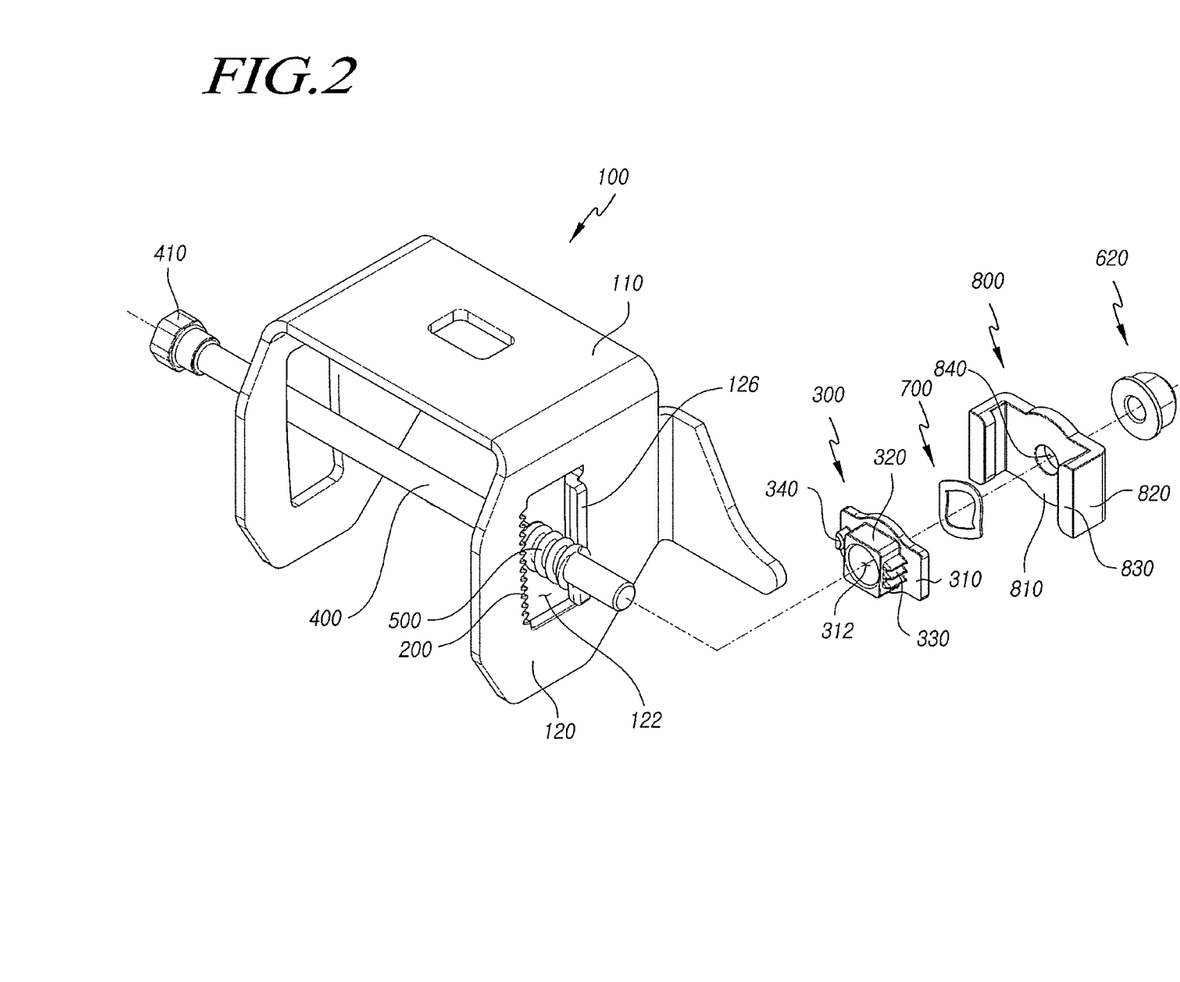
FIG. 2 is an exploded perspective view illustrating a tilt fixing device for a steering column according to the present embodiments.
Figure 3:
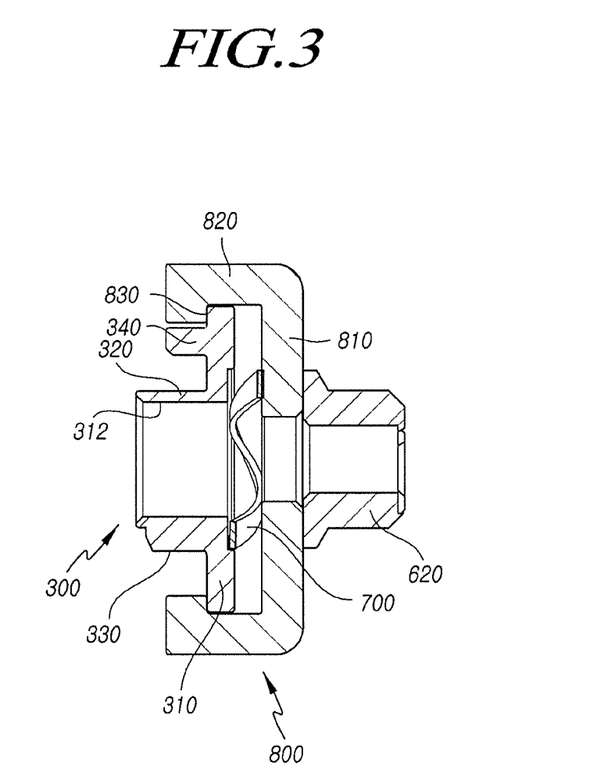
FIG. 3 is a sectional view illustrating a tilt fixing device for a steering column according to the present embodiments.
Figure 4:
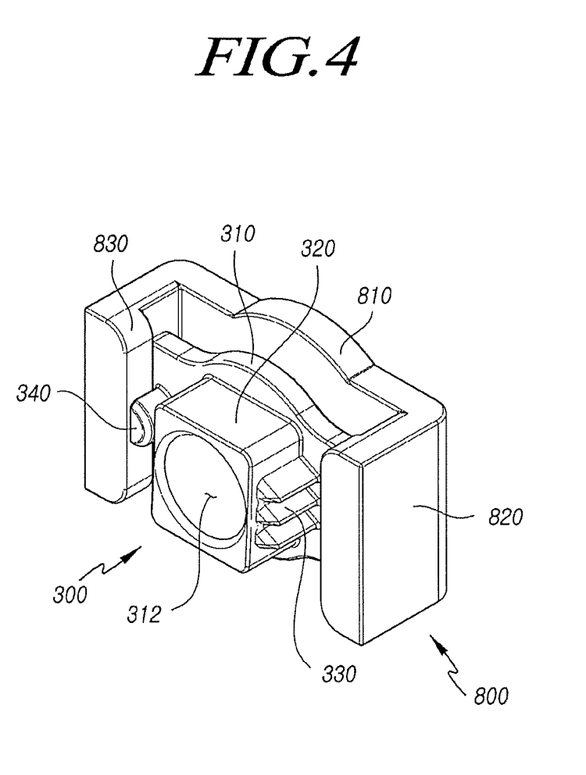
FIG. 4 is a perspective view illustrating a tilt fixing device for a steering column according to the present embodiments.
Figure 5:
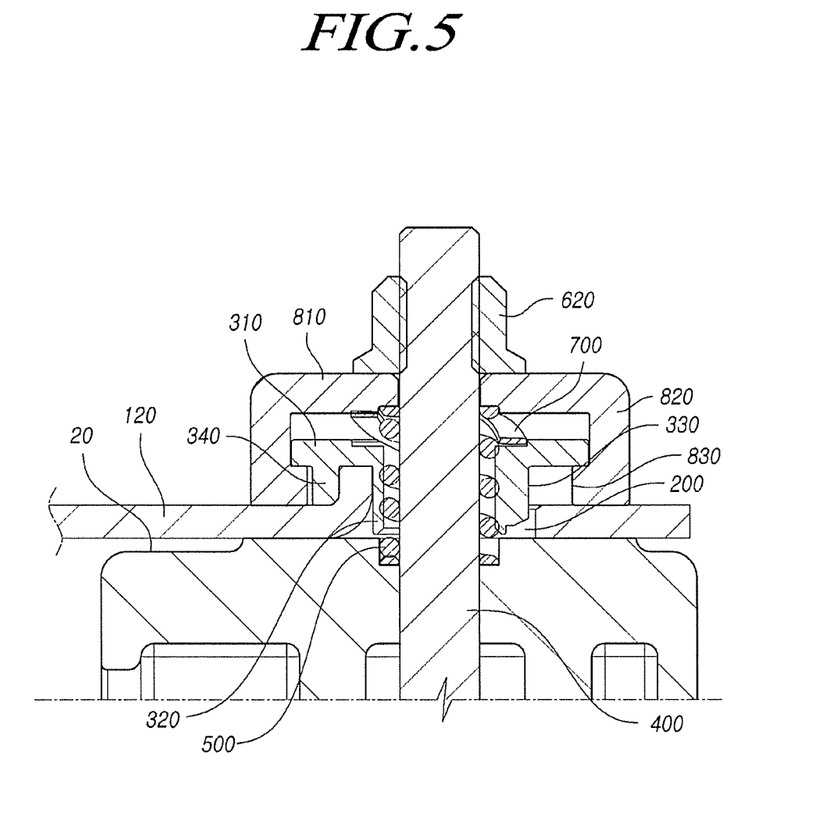
FIG. 5 is a sectional view illustrating a tilt fixing device for a steering column according to the present embodiments.
Figure 6:
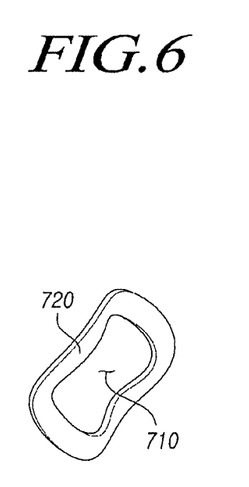
FIG. 6 is a perspective view illustrating a part of a tilt fixing device for a steering column according to the present embodiments.
Figure 7:
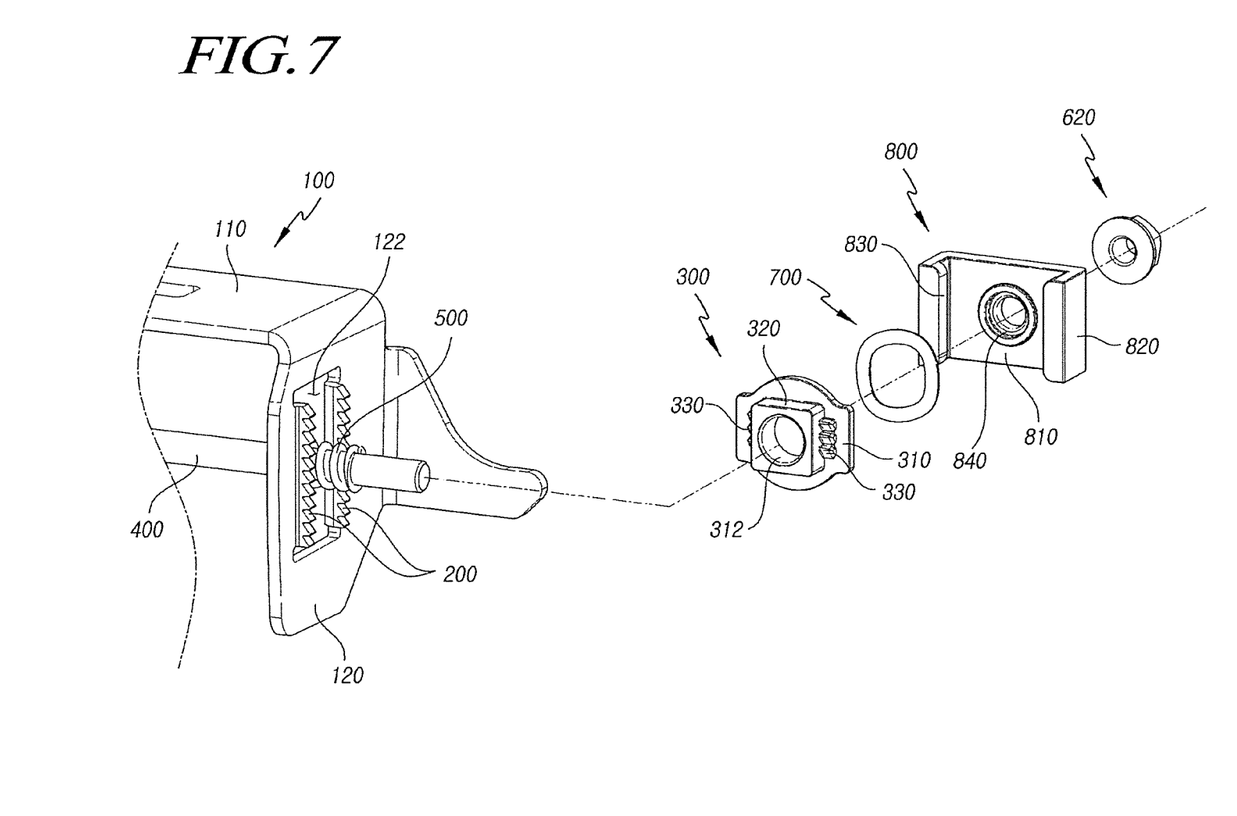
FIG. 7 is an exploded perspective view illustrating a tilt fixing device for a steering column according to the present embodiments.
Figure 8:
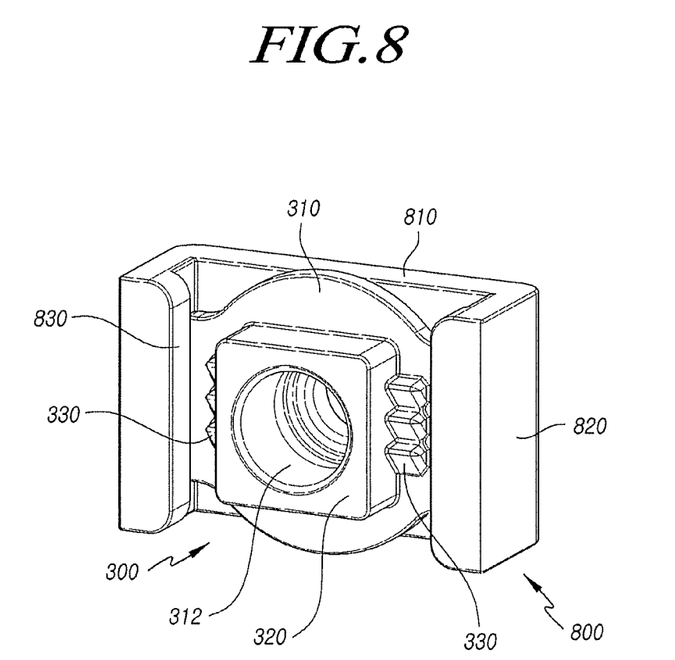
FIG. 8 is a perspective view illustrating a tilt fixing device for a steering column according to the present embodiments.
Figure 9:
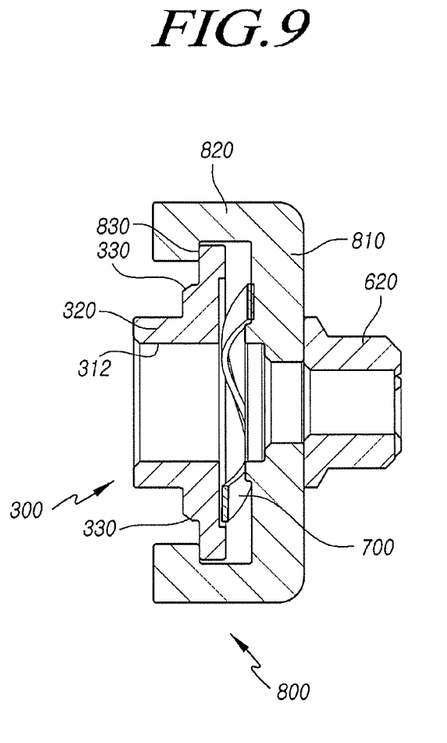
FIG. 9 is a sectional view of FIG. 8.
Figure 10:
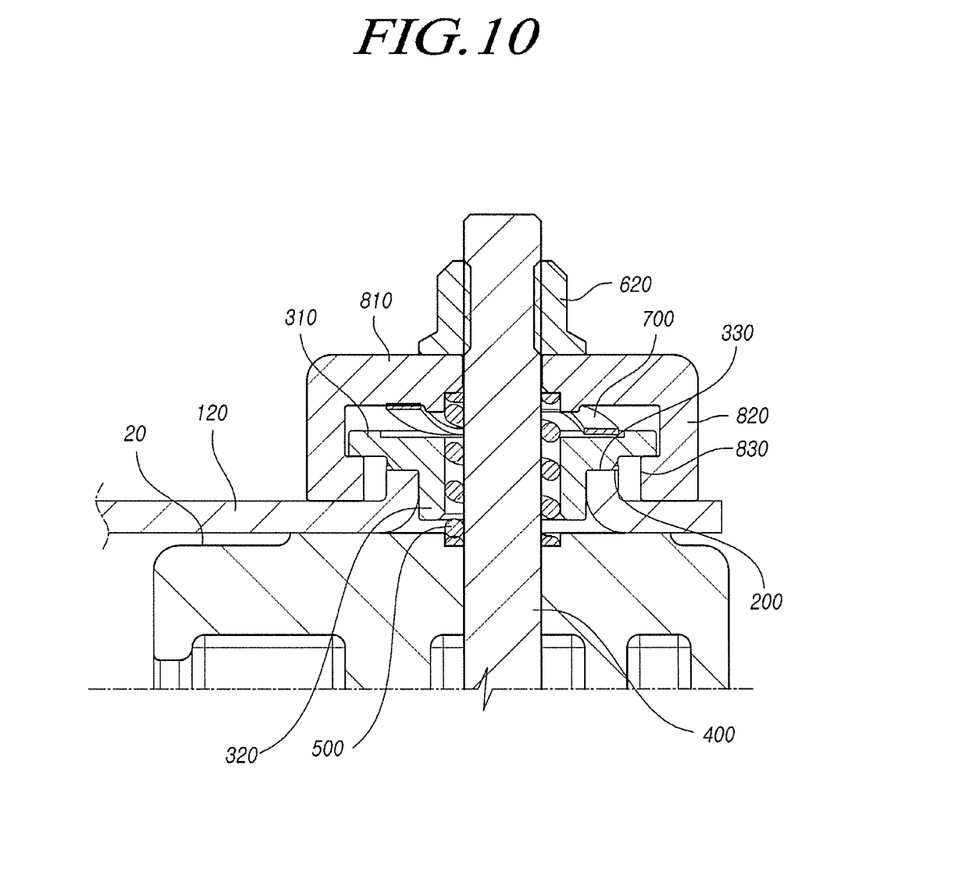
FIG. 10 is a sectional view illustrating a tilt fixing device for a steering column according to the present embodiments.

FIG. 1 is a perspective view illustrating a steering column according to the present embodiments. FIG. 2 is an exploded perspective view illustrating a tilt fixing device for a steering column according to the present embodiments. FIG. 3 is a sectional view illustrating a tilt fixing device for a steering column according to the present embodiments. FIG. 4 is a perspective view illustrating a tilt fixing device for a steering column according to the present embodiments. FIG. 5 is a sectional view illustrating a tilt fixing device for a steering column according to the present embodiments. FIG. 6 is a perspective view illustrating a part of a tilt fixing device for a steering column according to the present embodiments. FIG. 7 is an exploded perspective view illustrating a tilt fixing device for a steering column according to the present embodiments. FIG. 8 is a perspective view illustrating a tilt fixing device for a steering column according to the present embodiments. FIG. 9 is a sectional view of FIG. 8. FIG. 10 is a sectional view illustrating a tilt fixing device for a steering column according to the present embodiments.

Referring to the drawings, a tilt fixing device for a steering column according to the present embodiments includes a tilt bracket 100, a movable gear 300, a lever bolt 400, a load support member 800, a first elastic member 700, and a second elastic member.

A steering column 10 to which the tilt fixing device is applied includes, referring to FIG. 1, an inner tube 12 coupled to the outer side of a steering shaft 5 and an outer tube 11 coupled to the outer side of the inner tube. The inner tube 12 and the outer tube 11 may be formed as cylindrical hollow bodies, respectively, and the inner tube 11 is structured to be inserted into the outer tube 11. Accordingly, the inner tube 12 is moved into the outer tube 11 or out of the outer tube 11. The outer tube 11 is fixed to the chassis by a mounting bracket 40.

The tilt bracket 100 is installed on the outer side of a distance bracket 20, and the distance bracket 20 is fixedly coupled to the outer tube 11.

The tilt bracket 100 includes a flat plate-type base 110 coupled to one side of the mounting bracket (40) (lower side of the mounting bracket with reference to FIG. 1) and tilt guides 120 formed on both sides of the base 110 in bent shapes, respectively. For example, the tilt bracket 100 may have a "Π"-shaped section.

Each tilt guide 120 has a tilt hole 122 elongated in the tilting direction of the steering column 10. A movable gear 300 is arranged on the outer side of the tilt guide 120 on one side, and an adjustment lever 90 is arranged on the outer side of the tilt guide on the other side so as to rotate the lever bolt 400.

A stationary gear 200 including threads and troughs is formed on one side of the tilt hole 122 of the tilt guide 120 on one side.

A movement guide 126 is formed on the opposite side of the tilt hole 122, which has the stationary gear 200 formed on one side thereof, so as to face the stationary gear 200. The movement guide 126 is configured to guide the movement of the movable gear 300 during a tilting operation of the steering column 10.

Particularly, the tilt hole 122 has the shape of a rectangle elongated in the tilt operating direction. The stationary gear 200 famed on one side inside the tilt hole 122 has threads and troughs formed to protrude toward the inner side of the tilt hole 122. The movement guide 126 is formed on the other side inside the tilt hole 122 so as to protrude toward the outer side of the tilt guide 120. Accordingly, the movable gear 300 is supported on the movement guide 126, when the tilt is released, and moves in the tilting direction such that vibration can be prevented.

The movable gear 300 is coupled to the stationary gear 200 so as to fix the steering column. The movable gear 300 includes a movable gear body 310 formed in an approximately flat plate shape; a guide 320 formed to protrude from the movable gear body 310; teeth 330 configured to mesh/couple with the stationary gear 200; and a guide support 340 that supports the movement of the movable gear 300.

The movable gear body 310 has a facing surface formed on a side surface thereof so as to face the load support member 800, and has a through-hole 312 formed at the center of the facing surface such that a lever bolt 400 is inserted therein.

The guide 320 is formed to protrude from a different side surface of the movable gear body 310 in a hexahedron shape. The guide 320 is formed integrally with the movable gear body 310 such that a through-hole 312 extends through the hexagonal center with the same size. During a tilting operation, the guide 320 is inserted into the tilt hole 122 and moves along the tilt hole 122.

The teeth 330 include threads and troughs formed on the outer surface of the guide 320 so as to mesh with the threads and troughs of the stationary gear 200.

The guide support 340 protrudes from a different side of the movable gear body such that, during a tilting operation, the same moves while being supported by the movement guide 126.

The lever bolt 400 is coupled to the adjustment lever 90 and rotates while interworking therewith such that, as the adjustment lever 90 is manipulated, the tilting operation of the steering column 10 is enabled. A cam unit (not illustrated) may be interposed between the adjustment lever 90 and the lever bolt 400 so as to generate distances of spacing and contraction in the axial direction.

The lever bolt 400 is installed to penetrate both tilt guides 120 of the tilt bracket 100. One end of the lever bolt 400 protrudes toward the outer side of the tilt guide 120 on one side, and threads may be formed on the outer peripheral surface of the lever bolt 400, which protrudes, such that a lever nut 620 is coupled thereto. A second elastic member 500 is inserted/coupled into the outer peripheral surface of the lever bolt 400, and the second elastic member 500 is arranged between the distance bracket 20 and the load support member 800.

Particularly, the second elastic member 500 elastically supports the load support member 800 with regard to the distance member 20 such that, during a manipulation to release the adjustment lever, the movable gear 300 and the load support member 800 can secure sufficient spacing distances from the stationary gear 200. A coil spring may be used as the second elastic member 500 and coupled to the outer peripheral surface of the lever bolt 400.

A head 410 may be provided on a different end of the lever bolt 400 so as to have a diameter larger than the diameter of the lever bolt 400 and, in this case, the head 410 may be coupled to the adjustment lever 90 by a cam unit or the like.

The lever nut 620 is coupled to an end of the lever bolt 400, which protrudes toward the outer side of the movable gear 300, and a bearing or a washer may be coupled between the lever nut 620 and the load support member 800.

The first elastic member 700 has, as illustrated in FIG. 6, a through-hole 710 formed at the center thereof such that the lever bolt 400 penetrates the same. The first elastic member 700 has an elastic portion 720 having a flat plate formed along the outer periphery thereof so as to have a predetermined width and bent in the axial direction of the lever bolt 400. The elastic portion 720, having such a bent shape, provides elastic force between the movable gear 300 and the load support member 800. Therefore, the first elastic member 700 is positioned between the movable gear 300 and the load support member 800 and is supported by the load support member 800, when the adjustment lever 90 is locked, so as to support the movable gear by elastic force in such a direction that the same is inserted into the tilt hole 122.

The first elastic member 700 also provides elastic force between the movable gear 300 and the load support member 800 when the movable gear 300 and the stationary gear 200 are coupled by locking the adjustment lever. This guarantees that, even if threads of the movable gear 300 and threads of the stationary gear 200 engage with each other (tooth-on-tooth phenomenon), locking of the adjustment lever 90 is enabled by elastic force and, if an impact is applied from the outside, the threads of the movable gear 300 can slide and be coupled to the troughs of the stationary gear 200 by means of the elastic force.

The load support member 800 includes a body 810 having an outer surface fixed by the lever nut 620, having an inner surface on which the first elastic member 700 and the second elastic member 500 are supported, and having a through-hole 840 formed therein such that the lever bolt 400 penetrates the same; and side portions 820 bent from both ends of the body 810 toward the tilt guides 120 and supported by the tilt guides 120, respectively.

The load support member 800 has coupling support ledges 830 formed inside the ends of the side portions 820 such that both ends of the movable gear 300 are supported thereon, respectively. Accordingly, the movable gear 300 is positioned between the inner surface of the body 810 and the coupling support ledges 830 while being elastically supported by the first elastic member 700, and is prevented from being released.

Operations of the tilt fixing device for a steering column, configured as above, will now be described.

Firstly, the lever bolt 400 is rotated in one direction by manipulating the adjustment lever 90 and is released from the lever nut 620. The load support member 800 and the movable gear 300 are then spaced from the stationary gear 200 by restoring force from the second elastic member 500, thereby releasing the tilt locking condition. The driver can accordingly perform an operation to tilt the steering column.

After adjusting the angle of the steering column 10 according to his/her body type, on the other hand, the driver needs to switch from the tilt allowing condition to the tilt locking condition. When the lever bolt 400 is accordingly rotated in the opposite direction by manipulating the adjustment lever 90, the lever bolt 400 and the lever nut 620 are fastened to each other, and the load support member 800 and the movable gear 300 overcome the restoring force from the second elastic member 500 and are coupled to the stationary gear 200.

Meanwhile, threads of the stationary gear 200 and threads of the movable gear 300 may engage with each other (tooth-on-tooth phenomenon) during the tilt locking condition. In this case, the movable gear body 310 of the movable gear 300 elastically compresses the first elastic member 700 such that tilt locking occurs. When an impact is applied, the threads of the stationary gear 200 and the threads of the movable gear 300 slip with regard to each other, and the stationary gear 200 and the movable gear 300 normally mesh with each other, stably constraining the steering column.

The stationary gear 200 needs to have sufficient strength and elasticity such that a tilt locking operation can occur even if the tooth-on-tooth phenomenon occurs between the stationary gear 200 and the movable gear 300. Accordingly, the first elastic member 700 positioned between the movable gear 300 and the load support member 800 enables tilt locking even if the tooth-on-tooth phenomenon occurs between the stationary gear 200 and the movable gear 300. The first elastic member 700 exhibits elastic force even in the case of the tooth-on-tooth phenomenon with regard to the movable gear 300. Therefore, the movable gear 300 is preferably made of a material having sufficient strength and elasticity, such as spring steel.

According to the present embodiments described above, the load support member 800 directly pushes the tilt bracket 100 and enables tilt locking even if the tooth-on-tooth phenomenon occurs between the stationary gear 200 and the movable gear 300, and the first elastic member 700 undergoes elastic deformation and absorbs the displacement. The elastic force generated by the movable gear 300 prevents the tooth-on-tooth phenomenon between the stationary gear 200 and the movable gear 300 such that the driver can be provided with a stable lever manipulation feeling. The steering column is prevented from popping up due to an external impact and the like, thereby securing the driver's safety.

Referring to FIG. 7 to FIG. 10, a tilt fixing device for a steering column according to the present embodiments may include a tilt bracket 100, a stationary gear 1010, a movable gear 1020, a lever bolt 400, a first elastic member 700, a second elastic member 500, and a load support member 800.

As illustrated in the drawings, tilt guides 120 are famed on both sides of the tilt bracket 100, respectively. Tilt holes 122 are faulted in the tilt guides 120, respectively. Stationary gears 200 are formed to protrude from both sides of each tilt hole 122, which face each other, toward the outer side of each tilt guide 120. Each stationary gear 200 includes threads and troughs formed to protrude perpendicularly to each tilt guide 120.

The movable gear 300 is installed outside the tilt guide 120 such that, during an operation to tilt the adjustment lever, the same meshes with or separates from the stationary gears 200 and is inserted into or released from the tilt hole 122.

The movable gear 300 includes, as illustrated in FIG. 7 and FIG. 8, a movable gear body 310, a guide 320, and teeth 330.

The movable gear body 310 has a facing surface foisted on a side surface thereof so as to face the load support member 800. A through-hole 840 is formed at the center of the facing surface such that a lever bolt 400 is inserted therein.

The guide 320 is formed to protrude from a different side surface of the movable gear body 310. The guide 320 is formed integrally with the movable gear body 310 such that a through-hole 312 extends through the center thereof. The guide 320 is inserted into the tilt hole 122 of the tilt guide 120 and moves along the tilt hole 122 during a tilting operation.

The teeth 330 are formed between both side surfaces of the guide 320 and the movable gear body 310, and includes threads and troughs formed to mesh with threads and troughs of the stationary gears 200, respectively.

Therefore, the threads and troughs formed to protrude from the teeth 330 of the movable gear 300 mesh with and are coupled to threads and troughs of the stationary gears 200, which face the same, respectively.

According to the present embodiments described above, no tooth-on-tooth phenomenon occurs between the stationary gears and the movable gear when the driver conducts a tilt locking operation. Even if such a tooth-on-tooth phenomenon occurs, the first elastic member installed between the movable gear and the load support member enables tilt locking of the steering column. If an external impact is applied, the movable gear slides and meshes with the stationary gears by means of elastic force from the first elastic member such that there occurs a stable operation to tilt the steering column, thereby securing the driver's safety.

It could be understood that the above description of the present embodiments is for illustration, and a person skilled in the art to which the present embodiments pertain could easily modify the same into another specific form without changing the technical idea or essential feature of the present embodiments.

That is, the above-described embodiments are to be understood as being illustrated in every aspect, not limiting in any sense. For example, each element described in a single type could also be implemented in a dispersed manner, and elements described as being dispersed could likewise be implemented in a combined type.

Therefore, the scope of the present embodiments is defined by the following claims, and is to be interpreted as encompassing the meaning of the claims, the scope thereof, and all changes derived from an equivalent idea thereof or modified forms thereof.

What is claimed is:

1. A tilt fixing device for a vehicular steering column, comprising:
    a tilt bracket having a tilt guide coupled to an outer side of a distance bracket, a tilt hole being formed in the tilt guide, and a stationary gear comprising threads and troughs being formed on one of both sides of the tilt hole facing each other;
    a movable gear configured to mesh with or separate from the stationary gear, during tilting operation of an adjustment lever, and to be inserted into or released from the tilt hole;
    a lever bolt configured to be coupled to the adjustment lever and to rotate while interworking with the adjustment lever and installed to penetrate the tilt hole and the movable gear;
    a load support member configured such that the lever bolt penetrates and is coupled to the load support member, one end of the load support member being supported on the tilt guide, and a different end thereof being coupled to the lever bolt by a lever nut; and
    a first elastic member positioned between the movable gear and the load support member so as to elastically support the movable gear in such a direction that the movable gear is inserted into the tilt hole,
    wherein a movement guide is formed on the opposite side of the tilt hole facing the stationary gear such that the movable gear moves while being supported by the movement guide during tilting operation of the steering column, and
    wherein the tilt hole is formed in the shape of a rectangle elongated in a tilting operation direction, the stationary gear has the threads and troughs formed to protrude toward an inner side of the tilt hole, and the movement guide is formed to protrude toward an outer side of the tilt guide.

2. The tilt fixing device for a vehicular steering column of claim 1, wherein the movable gear comprises:
    a movable gear body having a facing surface formed on a side surface so as to face the load support member and having a through-hole formed at the center of the facing surface such that the lever bolt is inserted;
    a guide formed to protrude from a different side surface of the movable gear body, the through-hole being formed at the center of the guide, and the guide being inserted into the tilt hole and moved along the tilt hole during tilting operation;
    teeth comprising threads and troughs formed on an outer surface of the guide so as to mesh with threads and troughs of the stationary gear; and
    a guide support protruding from a different side of the movable gear body so as to move while being supported on the movement guide during tilting operation.

3. The tilt fixing device for a vehicular steering column of claim 1, further comprising a second elastic member coupled to an outer peripheral surface of the lever bolt and positioned between the distance bracket and the load support member so as to provide elastic force.

4. The tilt fixing device for a vehicular steering column of claim 3, wherein the load support member comprises:
    a body having an outer surface fixed by the lever nut and having an inner surface on which the first elastic member and the second elastic member are supported; and
    side portions bent from both ends of the body toward the tilt guide and supported on the tilt guide, respectively.

5. The tilt fixing device for a vehicular steering column of claim 4, wherein the load support member has coupling support ledges formed inside ends of the side portions such that both ends of the movable gear are supported on the coupling support ledges, and the movable gear is positioned between an inner surface of the body and the coupling support ledges while being elastically supported by the first elastic member.

6. The tilt fixing device for a vehicular steering column of claim 1, wherein the first elastic member has a through-hole formed at the center thereof such that the lever bolt penetrates the same, and the first elastic member is provided with an elastic portion having a flat plate formed along an outer periphery so as to have a predetermined width and bent in an axial direction of the lever bolt.

7. A tilt fixing device for a vehicular steering column, comprising:
    a tilt bracket having a tilt guide coupled to an outer side of a distance bracket, a tilt hole being formed in the tilt guide, and stationary gears comprising threads and troughs being formed to protrude from both sides of the tilt hole facing each other toward an outer side of the tilt guide;
    a movable gear configured to mesh with or separate from the stationary gear, during tilting operation of an adjustment lever, and to be inserted into or released from the tilt hole;

a lever bolt configured to be coupled to the adjustment lever and to rotate while interworking with the adjustment lever and installed to penetrate the tilt hole and the movable gear;

a load support member configured such that the lever bolt penetrates and is coupled to the load support member, one end of the load support member being supported on the tilt guide, and a different other end thereof being coupled to the lever bolt by a lever nut; and a first elastic member positioned between the movable gear and the load support member so as to elastically support the movable gear in such a direction that the movable gear is inserted into the tilt hole, wherein the movable gear comprises:

a movable gear body having a facing surface formed on a side thereof so as to face the load support member and having a through-hole formed at the center of the facing surface such that the lever bolt is inserted;

a guide formed to protrude from a different side surface of the movable gear body, the through-hole being formed at the center of the guide, and the guide being inserted into the tilt hole and moved along the tilt hole during tilting operation; and teeth comprising threads and troughs formed on an outer surface of the guide so as to mesh with threads and troughs of the stationary gear., wherein the tilt fixing device further comprises a second elastic member coupled to an outer peripheral surface of the lever bolt and positioned between the distance bracket and the load support member so as to provide elastic force, wherein the load support member comprises:

a body having an outer surface fixed by the lever nut and having an inner surface on which the first elastic member and the second elastic member are supported; and side portions bent from both ends of the body toward the tilt guide and supported on the tilt guide, respectively, and wherein the load support member has coupling support ledges formed inside ends of the side portions such that both ends of the movable gear are supported on the coupling support ledges, and the movable gear is positioned between an inner surface of the body and the coupling support ledges while being elastically supported by the first elastic member.

\* \* \* \* \*